Patented Aug. 29, 1933

1,924,748

UNITED STATES PATENT OFFICE

1,924,748

ABRASIVE BODY AND METHOD OF MAKING THE SAME

Emil E. Novotny, Philadelphia, Pa., and Joseph N. Kuzmick, Passaic, N. J., assignors of one-half to John Stogdell Stokes, Huntingdon Valley, Pa., and one-half to Raybestos-Manhattan, Inc., Passaic, N. J., a corporation of New Jersey No Drawing. Application February 20, 1931
Serial No. 517,300

8 Claims. (Cl. 51—280)

The object of this invention is to produce abrasive bodies such as wheels, discs, segments, etc. of improved cutting qualities, strength and uniformity, said bodies comprising a composition including a thermo-setting resin as a permanent bond and a liquid furane body containing a hydroxyl group, specifically furfuryl alcohol, as a temporary bond.

The use of a liquid furane hydroxyl product such as, specifically, the furfuryl alcohol, provides a body which promotes the uniform disperson and suspension of the resin bond and abrasive grain and at the same time acts as an ideal fluxing agent for the thermosetting resin bond during the final hardening operation.

The furfuryl alcohol does not combine with the ammonia liberated from the hexamethylenetetramine or other hardening agents used and, therefore, does not produce a pulverized reaction product which interferes seriously with the wetting and adhesion of the resin bond to the faces of the abrasive grain. While slight traces of acid usually present in a thermosetting resin may cause the furfuryl alcohol to resinify within itself, such action accounts for only minute traces of such product, most of the remaining furfuryl alcohol being driven from the mass during the final hardening operation and may be condensed or recovered for subsequent use.

Through the use of furfuryl alhocol or its equivalents we are enabled to provide a simple method for the processing of these articles and through such simplicity are enabled to provide a final end product or article of utmost uniformity so far as strength, hardness and cutting characteristics are concerned.

The following tabulation will clearly show the novelty and simplicity of our method:

1. The use of furfuryl alcohol or its equivalents provides a uniformly moist and granular composition free from lumps which requires no screening and which may be readily leveled in the mold.

2. The wetting agent, furfuryl alcohol or its equivalent, is preferably added to the mixture of resin and abrasive grain while the composition is being mixed and blended preferably through the use of a spray or mist issuing from one or more nozzles, uniformly and gradually moistening all surfaces of resin and abrasive and also any fillers incorporated therewith.

3. It is possible for the operator to judge with accuracy the temporary bonding qualities or wetness of such composition during the addition of the wetting agent; said wetting may be continued, interrupted and resumed at any time prior to the actual molding of the article. It is not at all desirable nor necessary that the surfaces of the abrasive grains should carry and distribute any or all such wetting agent. The operator is enabled to use a simple hand or mechanically operated tabletting mold and testing device to determine precisely while the wetting is being carried on or while interrupted, the exact degree of cohesiveness or wetness of the mass.

4. Variations in the solubility of different lots of resins or mixtures of thermosetting resins will not affect the above determination with exactitude, and furthermore, changes in solubility due to changes in temperatures and humidity are all provided as the operator merely wets to the desired degree which is reflected in the strength of the briquette tested by him and may interrupt, resume or stop the wetting of the product as during the mixing of the batch.

5. The wetting agent is most suitable as it is a relatively poor solvent for the resin and for this reason permits the production of a granular mass free from lumps without screening regardless of whether or not the abrasive grain surfaces are first partly wetted with such solvent.

6. The furfuryl alcohol or its equivalent is not reactive with respect to either the ammonia present in the hardening agent or the thermosetting resin used as a bond and, therefore, the product will not produce a useless gel upon the composition standing for a few hours before being pressed or hardened.

7. The wetting of the composition uniformly so far as the faces of both the abrasive and resin grains are concerned is much more conducive to uniformity. This is possible through the choice of wetting agent used which, though a solvent for the resin, is a relatively slow solvent and, therefore, permits the wetting and dispersion to take place before a sticky and gummy mass will result.

In the past, where furfural has been used as a solvent and hardening agent for the synthetic resin bonded abrasive composition, it has been essential that the amount of furfural used as a wetting agent for the faces of the abrasive grains should be correct within very narrow limits to provide a mass which will be sufficiently cohesive and still sufficiently dry to prevent the formation of a uniformly sticky, gummy mass. Under ordinary conditions of operation the amount of furfural so used has had to be correct to within one per cent plus or minus of the optimum quantity of such furfural requirement to secure a mass which will give the most desirable properties from the standpoint of a granular mass and from the standpoint also of a moldable mass. Where an error in judgment or various variables result in the use of more than one per cent of the optimum quantity of furfural required, producing a sticky, tacky and gummy mass, then such mass becomes difficult to properly level within the mold. It is a well recognized fact in cold molding practice that a uniformly granular product which will pour and level in the mold cavity is quite essential to produce uniformity. On the other hand, if less than the required amount within the optimum limits has been used, then the mass is too dry. The resin may not be uniformly suspended on the grain and the product will not cohere sufficiently and will result in an un-uniform suspension of abrasive grain and bond. It is, of course, true that where a deficiency of furfural had been used that additional abrasive grain may be wetted with an amount of furfural which will result in an excess when such grain is added to the previously made mix and that this excess may be distributed to suspend such resinous particles and to impart the desired cohesiveness. On the other hand, where a mass has been found to be too wet, it is possible to dry out such mass by the addition of an excess of resin, but in either event the product will be un-uniform because the proportion of abrasive grain to resin will be altered, producing a nondescript product when judged in accordance with the uniform scale of hardness on which basis such abrasive wheels are requisitioned and sold. Now, when it is considered that room temperatures, humidity, resin solubility, purity of solvent, etc. all tend to bring about variations, it can readily be seen that the difficulties of the wheelmaker in endeavoring to produce a uniform product have been heretofore uncontrollable. To make matters worse, abrasive wheels, discs and segments are usually made of mixtures of various grain sizes, causing variation in surface areas and therefore in the amount of solvent necessary to wet such surfaces, resulting in empirical practices wherein the optimum conditions are left to good fortune and to the mercy of the conditions prevailing at the time.

The Martin method as described by him in U. S. Patent No. 1,626,246 is primarily intended for the manufacture of thin abrasive wheels and discs. In the production of abrasive bodies of this type it has been found necessary in actual commercial practice to dispense with the use of a power mixer as, otherwise, the mass would become sticky and gummy if thoroughly and uniformly mixed. The general practice has been to have several men mix small batches of the product in advance of the press operator, whereby it has been found possible through manual methods and observation of the mix to provide a mass that would be sufficiently granular for leveling in the mold after several slow and costly screening operations. A type of product quite similar to this can be produced with furfural used as described in the Brock U. S. Patent No. 1,537,454 by putting the problem and object up to a skilled mixer and directing him to provide a mixture having granular characteristics.

The production of granular bonded masses for cold molding of various objects or for the cold molding of abrasive wheels or other bodies is already old. In the production of cold pressed ceramic bonded wheels it has been the usual custom to wet the abrasive grain surfaces with a small quantity of water and then add the powdered dry clay which would be suspended upon the abrasive grain and would be plasticized by the wetting agent used. It is more simple to apply a wetting agent to a relatively non-absorbent surface such as the abrasive grain than it is to apply such wetting agent to an absorbent mass such as the dry pulverized clay. In the manufacture of fritted ceramic wheels where the clay has been previously fired to produce a glass-like vitreous body which is then ground to a fine impalpable powder, it has been the practice to coat the faces of abrasive grains with a sticky, tacky, cohesive and plasticizing agent such as molasses or paper waste liquor to provide an adhesive support for such pulverized ceramic bond and to further provide a temporary bond.

Furfuryl alcohol is ideally suited for the purpose of wetting the surfaces of the abrasive grain and synthetic resin powder as it provides a uniformly wetted granular mixture free from lumps and sticky characteristics. The furfuryl alcohol can be mixed either by hand or in a power driven mixer or, for that matter, even in a ball mill, and it is really immaterial at what stage of the operation this alcohol is introduced into the mix. The ability to complete the wetting operation in the presence of the complete mixture of abrasive grain, resin powder and other fillers offers exceptional advantages in the processing of such compositions up to the operation of pressing the finished article either in cold, slightly warm, or heated molds. The product is a well defined granular mix, depending upon the size of the particles used, and is not a manually formed granular product due to being forced through various sizes of screens by operators armed with blocks of abrasive material, by which means compounds heretofore have been made into screened, granular mixes. This function of wetting a compound and providing a granular mix as produced in the mixing device itself appears to be due to the use of the furfuryl alcohol inasmuch as it is a relatively poor solvent for the resin and, therefore, a sufficient time is available to thoroughly disperse the wetting agent before the solvent action of the alcohol becomes evident.

Other alcohols do not answer the same purpose as, for example, ethyl and methyl alcohols dissolve the resin too quickly and, furthermore, have a high vapor pressure, making it difficult to retain such alcohol within the mass until the composition is molded. Glycerine, on the other hand, does not have the required solvent action on the resin and, therefore, while it is possible to provide a granular mix which would be difficult to do with either ethyl or methyl alcohols, the product when pressed in cold molds is not sufficiently cohesive to provide a mechanically strong molded abrasive body which will not crumble away particularly at the edges.

We have found that benzyl alcohol seems to have almost the same desirable characteristics as the furfuryl alcohol, but the product is at the present time expensive and, therefore, we prefer to use furfuryl alcohol but consider that the benzyl alcohol could be substituted therefor. We do not, however, wish to be understood as considering all resin solvents as desirable for our purpose, nor even to consider that all alcohols are so desirable regardless of their vapor pressure or boiling point, and, therefore, we wish it to be understood that in the absence of standard chemical classification of the alcohols to suit our purpose we wish to include in our claims not only any furane body of a liquid nature at room temperatures having a hydroxyl group but also any other alcohols such as would have a vapor pressure, solubility and boiling point as to make them compatible with and result in the production of a granular product which may be readily leveled in the molds, which will provide an abrasive body when cold molded, free from crumbling, etc., and which is capable of being eliminated from the preformed mass in the subsequent heating and hardening operation without blistering such formed product.

Great precautions, however, are necessary in the use of furfuryl alcohol as such product will resinify within itself to produce, with explosive violence, dark colored resinous bodies. So far the synthetic resin powders most useful as a bonding agent have been made with either an acid or a basic catalyst. For example, while phenol resins of, say, the furfural or formaldehyde type are usually made with either an acid or basic catalyst, phenol resins of the glycerine-acetaldehyde or acetylene type are invariably made with an acid catalyst. It is therefore quite essential that the pH. values be considered when used in conjunction with furfuryl alcohol as it is not only a question of preventing the danger of an explosion but also to so stabilize the composition that little or no furfuryl alcohol will be permitted to form its resinous derivatives. If a large proportion of this alcohol were permitted to assume its resinous form, such product would be an impurity within the bonding material and would weaken the end product and make it less useful for the technical purpose we have in view.

The stabilization of the mix in the presence of a resin forming alcohol such as furfuryl alcohol is a simple matter indeed if care is exercised to see to it that the final catalyst or hardening agent for the resin is of a basic nature and is thoroughly dispersed throughout the resin if such resin has a high acid number or contains an appreciable amount of occluded acid or acid salt. Therefore, it is essential that the furfuryl alcohol be used in the presence of a thermosetting resin compound and abrasive particles having a pH. value sufficiently high to prevent the formation of any large amounts of alcohol resin. Stated otherwise, under ideal conditions such composition should have a pH. value of seven or higher.

Although the composition of abrasive grain may be mixed, wetted and bonded with the powdered resin in any suitable manner, we are giving herein a method suitable for the production of such products, it being understood, however, that such example is given to better illustrate the conditions previously described and that wide departures and variations in proportions, sequence of steps, etc. are possible without departing from the spirit of our invention. The quantities given are all by weight.

Provide a suitable mixing device but preferably an open end tumbling barrel such as is better known as a concrete mixer, consisting of a dumping type of receptacle which may or may not be provided with mixing baffles, and place therein 350 parts of No. 54 mesh abrasive granules and 50 parts of a phenol-formaldehyde resin of the potentially reactive type known in the trade as durite resin No. 278. This product is basic in its reactions toward the furfuryl alcohol which is subsequently to be added and, therefore, there is no danger from either an explosion or the formation of any appreciable amounts of furfuryl alcohol resin. If the resin were not properly basic in character the furfuryl alcohol would not remain as a liquid but would instantaneously be converted to a solid resinous body. It is essential that the furfuryl alcohol remain as a liquid during the mixing, pressing and hardening cycles. The mixing drum is caused to revolve, thus intimately mixing the resin and abrasive particles, and we may optionally, if desired, add 10 parts of asbestos floats which are also permitted to become mixed and thoroughly dispersed within this dry blend. At any time during the mixing operation and even while the addition of the various ingredients in any order is taking place, but preferably after the mixture of dry ingredients has been thoroughly blended, we add to this mixture in any manner or in any form but preferably while in motion, furfuryl alcohol or its equivalent preferably in finely divided form as through the use of an air or single jet nozzle spray. The mixing is continued in the zone of the spray until a product of uniform wetness, having a loose, granular appearance with no appreciable amount of dry, powdered, un-suspended resin, is obtained. It is not necessary to measure or weigh the quantity or furfuryl alcohol or its equivalent as such alcohol is preferably added in the presence of the blend of materials which are to form the composition of matter. The operator tests the mixture either by noting the wetness, tackiness and uniformity of mix by observation or through the use of a small tabletting mold which may be hand or mechanically operated, producing briquettes or tablets as the mixing progresses, and so soon as a briquette or tablet of the proper strength is produced the wetting operation may be interrupted or stopped. The strength of the tablet may quickly be determined through the use of a suitable strength testing device. As a guide, it might be stated that the furfuryl alcohol required would be about 7 grams to a mix of the size given or approximately about 15% of the weight of the resin used. The total mixing time is usually from 5 to 10 minutes, depending to some extent upon the size of the batch being produced, the speed of wetting the batch with the furfuryl alcohol, etc.

The batch of wetted granular material can be poured from the mixer in granular form and ordinarily, if properly wetted, requires no manual screening and re-screening operations before being charged into the mold cavity. The material is now charged into a suitable mold cavity, leveled and pressed into shape at pressures varying with the nature of the work, as from 500 to 5,000 pounds to the square inch. The pressing is usually done cold but, of course, the use of warm or heated molds is not precluded.

The formed product may now be placed into suitable ovens where the hardening takes place at gradually increasing temperatures well understood in the art. The heating cycle requires from 2 to 50 hours, depending on the size and thickness of wheels, kind of oven used, and on the reactivity of the thermosetting resin bond. As an illustrative example a 25 hour curing cycle usually preferred for a phenol-formaldehyde resin of medium reactivity may consist of 3 hours at 200° F.
    3 hours at 220° F.
    3 hours at 240° F.
    3 hours at 260° F.
    2½ hours at 280° F.
    2 hours at 310° F.
    3½ hours at 350° F.
    5 hours at 380° F.

Total time 25 hours.
Cool 1½ hours to 200° F.

The 25 hour cycle is suitable for wheels up to 18 inches in diameter and 1½ inches thick. As the diameter and/or thickness increases the low temperature portion of the curing cycle is increased to vaporize and eliminate the wetting agent, furfuryl alcohol, before the final setting takes place. The total heating cycle may require 50 hours for heavy wheels to obtain optimum results. If the high heat is applied too rapidly or before substantially all of the furfuryl alcohol is eliminated from the composition the product will blister. The use of counter pressure and a furfuryl alcohol combining agent is not precluded but results in added technical difficulties.

The quantity of wetting agent, furfuryl alcohol or its equivalent, is, as previously stated, about 15% of the resin weight, but this percentage is by no means fixed as it may be varied depending on the type of resin bond used, i. e., its solubility, melting point, etc., and other physical properties such as particle size and density, variations in the proportion of resin to abrasive grain, in the size and kind of grain used, and the use of other fillers, modifying agents, colors, solvents, etc., and variations in the purity of the furfuryl alcohol or its equivalent wetting agent.

Where a commercially pure grade of furfuryl alcohol is used it will usually be found that the quantity required to properly wet an abrasive composition varies from 5 to 26% of the weight of the resin used.

It should be noted, however, that the simplicity of our method does not require any measuring or weighing of a definite quantity of furfuryl alcohol or to consider the physical conditions surrounding the particular mix or the atmospheric conditions prevailing at the time, but that the operator may readily determine for himself, either by observation or from actual tests, the degree of wetting as the mixing and wetting progresses.

The use of a mixture of furfuryl alcohol, sodium furoate, traces of water and other impurities such as the crude mixture of the production of such furfuryl alcohol by the Connizzaro reaction is not as satisfactory but is not precluded.

When furfuryl alcohol is made by a catalytic reduction method using for example a nickel catalyst such product if unrefined contains some tetrahydrofurfuryl alcohol and furfural. Although not as satisfactory as commercially pure furfuryl alcohol, such mixture may be used where the reduced cost of such mixture is advantageous. It is therefore to be understood that the relatively pure alcohol is preferable but that various mixtures containing furfuryl alcohol or its derivatives are not precluded.

The method of wetting both the resin and abrasive composition with a spray of wetting agent allows for the control of such wetting both as to degree and condition of the mixture.

The proportion of resin bond to the weight of granular abrasive grains varies with the hardness and density of the abrasive body to be made. The use of 4 parts of resin will produce a very soft abrasive body and the use of 30 parts of a very hard body when used with 100 parts by weight of an average grade of abrasive grain. An abrasive composition using our wetting agent, furfuryl alcohol, can also be made by following the proportions given in the preceding example but modifying the mixing method in various ways.

The furfuryl alcohol or our classification of alcohols useful for this purpose, referred to by us as the furfuryl-benzyl alcohol groups due to their advantageous qualities which may be classified as certain ranges of vapor pressures, resin solubility and boiling points, provide abrasive wheels and articles of exceptional strength and cutting qualities regardless of how the addition of the alcohol is made to any portion or combination of such compound mixture. For example, these alcohols could be used as wetting agents for the abrasive grain as in the Martin process, but their selection is not due to the fact that they are resin solvents as all resin solvents cannot be commercially used. Neither are they selected simply because they are alcohols and are, therefore, non-reactive with respect to the resin forming material or resins themselves, but are primarily selected because it has been found by lengthy tests and commercial use that when furfuryl alcohol or, specifically, its equivalent such as benzyl alcohol is used, products of unusual efficiency are invariably made.

While the spray method offers several advantages, and while the wetting of the mix during the operation of blending and mixing the composition likewise offers advantages, the real essence of our invention resides in the use of furfuryl alcohol or, as a specific example, its equivalent for our purpose, the benzyl alcohol, in the composition regardless of the manner of introducing the product in such mixture.

It is also commercially possible to wet the surfaces of the abrasive grain with a portion of the alcohol, introduce the resin bond and after a short mix, applied by spraying or otherwise, a further amount of alcohol until a desired wetness is obtained.

As another example, the abrasive grain may be warmed to a temperature of from 150 to 180° F., depending upon the softening point of the resin bond to be used, and then adding to such abrasive grain while in the mixer, by sieving, spraying or in any other manner, a portion or the entire quantity of resin required for the bond, which resin will be suspended on the abrasive grain and, if the temperature is not too high, the mix will remain granular. To this dry mix we may add our furfuryl alcohol or equivalent as a wetting agent in an amount sufficient to provide the cohesiveness necessary.

With all these advantages it is not merely a question of greater uniformity of product and precision of operation, but the wheels made by our method have consistently shown exceptional cutting and wear resisting qualities reflected in a reduced cost in tonnage of materials processed. Many cost records are available and have been recorded by having production engineers present during the entire operating life of these numerous wheels under test, and accurate records being kept of materials produced and the elapsed time of actual operating being correctly maintained through stop watch readings. The competing wheels were all made in accordance with the Martin method, using a reactive aldehyde, specifically furfural, as the solvent, and our product as reported here was made through the use of furfuryl alcohol as a wetting agent applied to the mixture of abrasive grain and resin as a finely divided spray. The actual savings under strictly comparative conditions amount to at least 40%.

Wherein we use the term thermosetting resin we wish to include various resins of natural or synthetic origin or mixtures of these as for instance, the various well known phenol resins depending upon a phenolic body as one of the constituents such as phenol, cresol, xylenol, resorcinol, etc., when combined with various aldehydes, their polymers or derivatives as, for instance, formaldehyde, paraformaldehyde, hexamethylenetetramine, etc., or other well known resin forming aldehydes in their various forms as illustrated in the case of formaldehyde as, for example, furfural acetaldehyde, etc., or in place of the aldehydes other reactive resin forming bodies such as the carbohydrates including cellulose, starch, sugar, etc.; other synthetic resins utilizing urea or its derivatives such as thiourea when combined with various aldehydes, carbohydrates, etc. in the formation of a potentially reactive resinous body; other resins such as those of the glyptal type made of phthalic anhydride or its equivalent and glycerine or, in its stead, various polybasic acids. Natural thermosetting resins when in the presence of or associated with suitable hardening agents such as the aldehydes or their derivatives would embrace such products as gum accroides and dragon's blood. Resins made of resorcinol and paraformaldehyde produce exceptionally strong, flexible bodies. Resins made of phenol and acetylene are also useful for our purpose, providing bodies having high shock resistance. A mixture of various resins is often advantageous as it is possible to provide soft cutting bodies without requiring the reduction of the bond to the point where the body would be lacking in mechanical strength as, for example, the use of a high percentage of gum accroides having added thereto a sufficient amount of hardening agent such as hexamethylenetetramine and intermixed with from 10 to 50% of its weight in a phenol-formaldehyde resin will provide a body having soft cutting qualities.

The furfuryl-benzyl alcohol class as defined by us need not necessarily be used merely as a wetting agent as a sufficient proportion of such alcohol may be used as a solvent for a thermosetting resin and such solution may be either of low or high specific viscosity and may be mixed with the abrasive granules in any desired manner either to provide a normally sticky, tacky mass which may be rolled into shape in the mold cavity, or a dry, granular mix made so through the addition of a substantial quantity of dry, granular abrasive particles, various fillers or dry, finely comminuted, potentially reactive resin. When so used it is to be further understood that our furfuryl-benzyl class of alcohols are not reactive with respect to the resins nor to the ammonia containing hardening compounds such as hexamethylenetetramine, furfuramid etc. and, therefore, such hardening agents may be introduced into such alcoholic solution for dispersion with a normally non-reactive resin as, for example, a product of the Novolak type in order to convert such nonreactive resin to its reactive form.

What we claim is—

1. An abrasive composition comprising abrasive granules, a thermosetting resin and an alcohol of the furfuryl-benzyl class.

2. An abrasive composition comprising abrasive granules, a thermosetting resin and furfuryl alcohol.

3. A method of making an abrasive article consisting of the steps of mixing a thermosetting resin bond and abrasive granules, coating the ingredients of the mix with an alcohol of the furfuryl-benzyl class while the mixing progresses until a well-wetted granular mix of suitable cohesiveness is produced, forming into the shape of the finished article and heating the formed article to drive off the alcohol and cure the resin.

4. A method of making an abrasive article consisting of the steps of wetting a mixture of abrasive granules and a thermosetting resin bond with an alcohol of the furfuryl-benzyl class to produce a cohesive granular mix, cold molding the cohesive mix and heating to drive off the alcohol and set the resin bond.

5. A method as defined in claim 4, wherein the pH. value of the mixture is maintained above 7 in order to retard the resinification of the alcohol.

6. A method as defined in claim 4, wherein the pH. value of the mixture is controlled in order to retard the resinification of the alcohol.

7. In a method of making a granular article, the steps of mixing a dry filler and a dry pulverized thermosetting resin, coating the particles of of the mixture with sufficient furfuryl alcohol to cause the particles to cohere without converting the mass into a wet gummy mix, forming the article and finally driving off the furfuryl alcohol and setting the resin by means of heat.

8. A method of making an abrasive article consisting of the steps of wetting a mixture of abrasive granules and a thermosetting resin bond with furfuryl-alcohol to produce a cohesive granular mix capable of being cold molded, the pH. value of the mixture being maintained above 7 in order to retard the resinification of the alcohol.

EMIL E. NOVOTNY.
JOSEPH N. KUZMICK.